United States Patent
Shamarao

(10) Patent No.: US 8,432,408 B2
(45) Date of Patent: Apr. 30, 2013

(54) DATA RATE BUFFERING IN DISPLAY PORT LINKS

(75) Inventor: Prashant Shamarao, Duluth, GA (US)

(73) Assignee: Synaptics Incorporated, Santa Clara, CA (US)

( * ) Notice: Subject to any disclaimer, the term of this patent is extended or adjusted under 35 U.S.C. 154(b) by 527 days.

(21) Appl. No.: 12/756,116

(22) Filed: Apr. 7, 2010

(65) Prior Publication Data
US 2011/0249192 A1    Oct. 13, 2011

(51) Int. Cl.
*G09G 5/36*   (2006.01)
*G06T 1/60*   (2006.01)

(52) U.S. Cl.
USPC .......................................... 345/558; 345/530

(58) Field of Classification Search ................. 345/530, 345/558, 531
See application file for complete search history.

(56) References Cited

U.S. PATENT DOCUMENTS

| | | | | |
|---|---|---|---|---|
| 7,636,834 | B2 * | 12/2009 | Tang et al. | 711/219 |
| 8,037,370 | B2 * | 10/2011 | Glen | 714/700 |
| 2008/0204285 | A1 * | 8/2008 | Carter et al. | 341/67 |

OTHER PUBLICATIONS

VESA DisplayPort Standard, Version 1, Revision 1a, Jan. 11, 2008.

* cited by examiner

*Primary Examiner* — Jacinta M Crawford
(74) *Attorney, Agent, or Firm* — Haynes and Boone, LLP

(57) ABSTRACT

Rate matching for use in data links between a source device and a sink device is provided. A rate matching device includes a first-in-first-out (FIFO) buffer having a write pointer and a read pointer; a write control having a write clock to write an input data stream from the source device onto the FIFO buffer using the write pointer; a read control having a read clock to read data from the FIFO buffer using a read pointer, insert data to an output data stream and transmitting the data stream to the sink device; a processor to provide a bit number based on the write clock period and the read clock period, wherein the read control inserts blanking data into the output data stream while the read pointer is stopped in the FIFO buffer to allow the write pointer to move ahead by the bit number provided by the processor. Some embodiments are thus able to avoid buffer overflow or underflow scenarios.

12 Claims, 6 Drawing Sheets

DATA RATE BUFFERING IN DISPLAY PORT LINKS

BACKGROUND

1. Field of the Invention

The present invention relates to rate matching in display technology links and, in particular, to data rate buffering in data links.

2. Discussion of Related Art

Digital display technology for video streams is being widely adopted within the personal computer (PC) and consumer electronics (CE) industries. The VESA DisplayPort Standard, Version 1, Revision 1a of Jan. 11, 2008 for video data links (hereinafter DisplayPort, or DP), incorporated herein by reference in its entirety, is an example of a standard that may be used for transmission of video streams.

The issue of data rate matching arises for a data link between a source of imaging data (the Source device) and a receiver of the data (the Sink device). In some cases, the source device transmits data at rates that differ from the display rate of the sink device. For example, different data rates may occur where a source intended for a protocol different from the DP standard is retro-fitted to transmit DP data. Moreover, in some cases the source device may drive data at a constant rate while the link used to connect to the sink device may be operated at varying data rates using operation techniques such as a spread spectrum clock (SSC) to provide a reduction in electromagnetic interference (EMI). By having such a mismatch in data rates between the source device and the sink device, underflow and overflow errors in the sink device buffer may be encountered, which may stall and break the data link, interrupting the video transmission.

What is needed with the adoption and compliance of DisplayPort standards is rate matching that avoids buffer underflow and overflow errors in a data link.

SUMMARY

A rate matching device and a method for use in data links between a source device and a sink device is provided, including a first-in-first-out (FIFO) buffer having a write pointer, a read pointer, and a selected depth; a write control having a write clock to write an input data stream from the source device onto the FIFO buffer using the write pointer; a read control having a read clock to read data from the FIFO buffer using a read pointer, insert data to an output data stream and transmitting the data stream to the sink device; a processor to provide a bit number based on the write clock period and the read clock period further wherein the read control inserts data into the output data stream while the read pointer is stopped in the FIFO buffer to allow the write pointer to move ahead by the bit number provided by the processor, thereby avoiding a buffer overflow and a buffer underflow in the sink device.

These and other embodiments of the present invention are further described below, with reference to the following figures.

BRIEF DESCRIPTION OF THE FIGURES

Wherever possible, the same reference numbers are used throughout the drawings to refer to the same or like elements.

DETAILED DESCRIPTION

Figure 1:
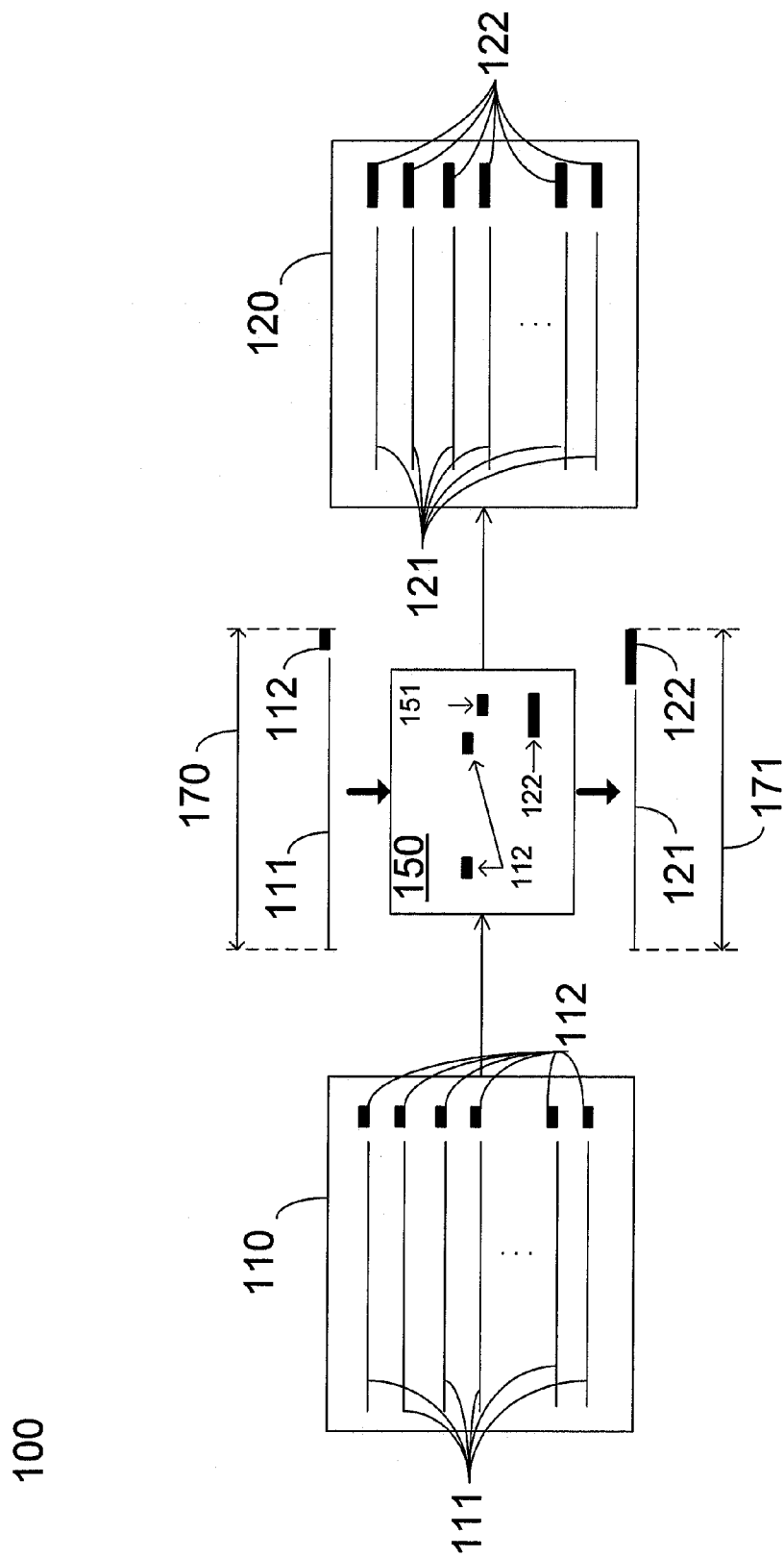
FIG. 1 shows a data transmission link between a source device and a sink device that includes a rate matching device, according to some embodiments of the present invention.

FIG. 1 illustrates a data link between a source device 110 and a sink device 120 according to some embodiments of the present invention. As shown in FIG. 1, a data transmission link 100 includes a source device 110, a sink device 120, and a rate matching device 150 coupled between source device 110 and sink device 120.

In embodiments that utilize a DisplayPort link, as described in the DP specification, a main link is provided between a transmitting display port (Tx) of source device 110, and a receiving display port (Rx) of sink device 120. The main link may include one, two, or four ac-coupled, doubly terminated differential pairs called lanes. The transmission lanes provide data transmission channels for the main link.

Some DP sources may not drive the data at a rate that is considered nominal by the DP specification. For example, the DP specs allow for the transmit (Tx) data rate to be between −5300 parts-per-million (ppm) and +300 ppm of the nominal data rate. This range of data rates, also called spread, may be used in some embodiments for spread spectrum clocking (SSC), which reduces the electromagnetic interference (EMI) of the link. Here, the term 'part-per-million' (ppm) means that, given a bit rate $Y_1$, a bit rate $Y_2$ may be different from $Y_1$ by Z ppm, wherein $$Z = \frac{Y_1}{(Y_2 - Y_1)} \times 10^6 \quad (1)$$

According to Eq. (1), a negative Z gives a $Y_2$ value lower than $Y_1$, and a positive Z gives a $Y_2$ value higher than $Y_1$.

In some examples, source device 110 may drive data at a constant rate of nominal minus 5000 ppm. While this data rate is within specification limits, it may not include SSC and hence it may not provide any EMI reduction. In such a situation, a rate matching driver as described in some embodiments of the present invention may be used downstream of the source to center the data rate to the nominal value and to add SSC to reduce the EMI generated.

Source device 110 may have a display port supporting a certain video format that displays images having horizontal pixel lines 111 terminated by blanking periods 112. Pixel lines 111 may provide the information to each pixel in the image to display a certain light intensity for a given color. Blanking periods 112 may appear at the end of pixel lines 111 and may contain information that will not be displayed by a pixel in a display port, but will be used by the display port controller to handle the video display. For example, in some embodiments of the present invention data transmitted during blanking periods 112 may include information about the display format of the image in the video stream. The display format may include the pixel resolution, or whether or not the lines are interlaced in the image. Moreover, data transmitted during blanking periods 112 may provide information as to whether the blanking period corresponds to the end of a horizontal pixel line in the display or the end of a vertical set of lines (as in the end of a frame). In some embodiments of the present invention, blanking periods 112 may also include data for the audio accompanying the video display. Likewise, sink device 120 may have a display port supporting a video format having horizontal pixel lines 121 terminated by blanking periods 122.

For source device 110, the combination of pixel line 111 and blanking period 112 results in a horizontal line of the video stream being displayed in a time period 170. Time period 170 may also be associated with the buffer size of the source display device. Likewise, for sink device 120 a pixel line 121 together with a blanking period 122 may result in a horizontal line of the video stream being displayed in a time period 171. Time period 171 may be associated with the buffer size of sink display device 120. According to some embodiments of the present invention, it is desirable that time period 170 and 171 be the same. Thus, the quality of the video stream between source device 110 and sink device 120 may be maintained. More generally, a predetermined relation between time periods 170 and 171 is desirable to maintain or even improve the quality of a video stream between a source device 110 and a sink device 120. Time period 170 is dependent on the size of the data strings contained in pixel lines 111 and blanking periods 112, and the clock period in source device 110. Time period 171 is also dependent on the size of the data strings contained in pixel lines 121 and 122, and the clock period in sink device 120. Moreover, the clock signals in source device 110 and sink device 120 may be varied according to the DP specifications. This variation may be configured in the video data link as a spread spectrum clocking scheme (SSC). A SCC scheme is provided to reduce EMI in source device 110 and in sink device 120. Furthermore, a source device 110 and a sink device 120 that comply with the DP specifications may have different clock periods at any point in time. This difference may also change in time, according to the SSC scheme used.

By adjusting the size of the output data stream, buffer underflow and overflow errors may be avoided in sink display device 120. For example, when the read clock operates at a rate $Y_2$ faster than the write clock rate $Y_1$, a buffer underflow situation may arise at the sink device 120. And when rate $Y_2$ of the read clock is lower than rate $Y_1$ of the write clock, then a buffer overflow may arise. Thus, a data stream that fits adequately in the buffer of sink display device 120 may be provided by rate matching device 150, according to some embodiments of the present invention.

According to some embodiments of the present invention as depicted in FIG. 1, rate matching device 150 is provided so that blanking data 151 may be introduced into blanking period 112 from the source device 110. The result is blanking period 122, which, combined with pixel line 121, takes a time period 171 for a line display at the sink device 120. Blanking data 151 may be adjusted so that time period 171 may be equal to time period 170, and the displayed pixel lines 111 and 121 may also be the same. Rate matching device 150 may achieve this even when the clocking signals in source device 110 and sink device 120 are different.

Figure 2:
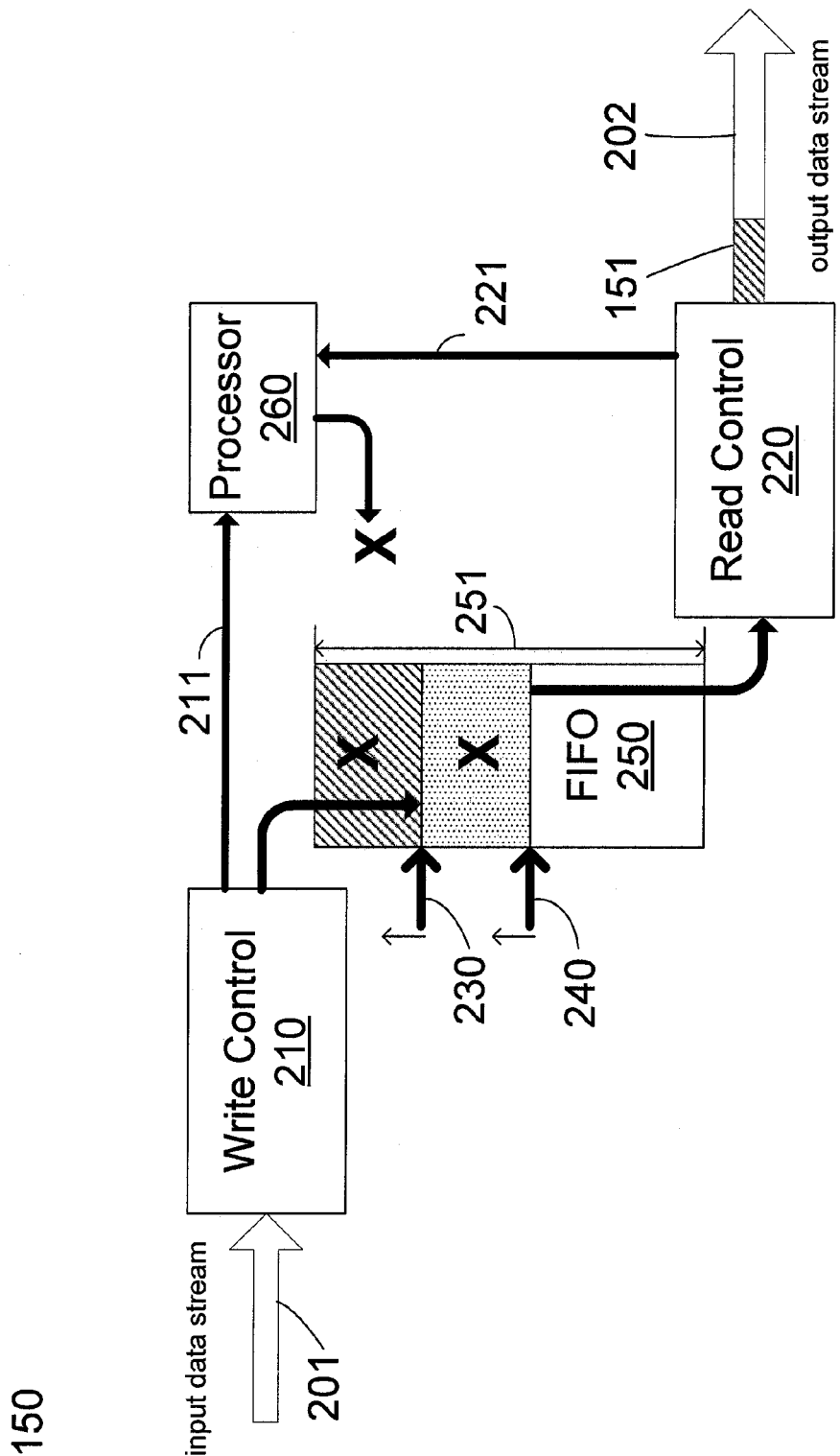
FIG. 2 shows a rate matching device according to some embodiments of the present invention.

FIG. 2 shows an embodiment of a rate matching device 150 including an input data stream 201, a write control 210, a first-in-first-out (FIFO) buffer 250 with a write pointer 230 and a read pointer 240, a read control 220, and an output data stream 202, according to some embodiments of the present invention. Write control 210 provides input data stream 201 to FIFO buffer 250, from where the data will be read by read control 220 and arranged into output data stream 202. Data from input data stream 201 is written by write control 210 onto FIFO buffer 250 following write pointer 230. Write pointer 230 moves along FIFO buffer 250 in a direction as pointed by the arrow in the figure. Following write pointer 230, there is provided read pointer 240, which directs the read operation performed by read control 220. Because source device 110 and sink device 120 may have different clock signals, write pointer 230 and read pointer 240 also operate at different clock intervals. Thus, write pointer 230 and read pointer 240 move across FIFO buffer 250 at different speeds. Buffer 250 has a depth 251 sufficient for write pointer 230 and read pointer 240 to scan buffer 250 continuously during the transmission of a horizontal display line. Further, read pointer 240 may lag behind write pointer 230 at every step of the data transfer process from source device 110 to sink device 120.

At the beginning of the horizontal line data transfer from source device 110 to sink device 120, read pointer 240 may be separated in FIFO buffer 250 from write pointer 230 by a difference X. Processor 260 evaluates the value of X by using clock period 211 provided by write control 210, and clock period 221, provided by read control 220. Examples of such calculations for an overflow buffer scenario and an underflow buffer scenario will be provided below.

In some embodiments, write pointer 230 has a number of X bits ahead of read pointer 240 in FIFO buffer 250, at the start of a horizontal line data transfer. Thus, a single write/read scan may be performed through FIFO buffer 250 during a horizontal line transmission.

The value of X may vary depending on the different configurations of the streaming video signal and the source and sink video devices. For example, a high resolution signal having 2560 (horizontal)×1600 (vertical) pixels at a 60 Hz frame rate, the DMT specification, incorporated herein by reference in its entirety, may have a total horizontal line time of $T_h$=10.13 μs. In some embodiments of the present invention corresponding to High Bit Rate (HBR) configurations, a write clock may have a bit rate $Y_1$=268.569 MHz. This corresponds to a clock period of $T_1$=3.724 ns. A read clock may have a bit rate $Y_2$=270.081 MHz, corresponding to a clock period of $T_2$=3.702 ns. Thus, the total number of cycles for write control 210 to write the data in FIFO buffer 250 is $C_w$, which may be given as:

$$C_w = \frac{T_h}{T_1} = \frac{10.13 \times 10^{-6} s}{3.724 \times 10^{-9} s} = 2720.19, \quad (2)$$

Read control 220 will take a time $T_r$ to read this line given by:

$$T_r = C_w \times T_2 = 2720.19 \times 3.702 \text{ ns} = 10070.14 \text{ ns}, \quad (3)$$

The time difference between $T_r$ and $T_h$ may be compensated according to some embodiments of the present invention by giving write pointer 230 a lead of X bits ahead of read pointer 240 wherein $$X = \frac{T_h - T_r}{T_1} = \frac{10.13 \times 10^{-6} s - 10.07014 \times 10^{-6} s}{3.724 \times 10^{-9} s} = 16.074 \approx 17, \quad (4)$$

The number of bits is rounded up to avoid cutting out the input data stream.

In some embodiments corresponding to a Reduced Bit Rate (RBR) configuration, a write clock may have a bit rate $Y_1$=161.1414 MHz. This corresponds to a clock period of $T_1$=6.206 ns. A read clock may have a bit rate $Y_2$=162.0486 MHz, corresponding to a clock period of $T_2$=6.17 ns. With the same resolution as above, the total horizontal line time is $T_h$=10.13 µs. The value of X is then given by $$X = \frac{T_h - T_r}{T_1} = \frac{10.13 \times 10^{-6} s - \frac{10.13 \times 10^{-6} s}{6.206 \times 10^{-9} s} \cdot 6.17 \times 10^{-9} s}{6.6026 \times 10^{-9} s} = 8.9 \approx 10, \quad (5)$$

Where the value is rounded up to 10 in order to account for a worst case scenario.

The values of X thus calculated for the HBR and RBR underflow situations may be used for lower video stream resolutions. Situations in which the number of pixels per horizontal line is less than considered in Eqs. (4) and (5) may use the same value of X. Scenarios having a lower resolution than 2560 (horizontal)×1600 (vertical) pixels may use a smaller depth 251 for a FIFO buffer 250. Thus, a value of X as given in Eqs. (4) and (5) may be sufficient for these scenarios as well.

In the case of an overflow buffer situation, a write clock in an HBR configuration may operate at a rate $Y_1$=270.0945 MHZ. This leads to a clock period of $T_1$=3.702 ns. A read clock may operate at a rate $Y_2$=268.569 MHz, with a clock period of $T_2$=3.724 ns. If the video stream has a resolution of 2560 (horizontal)×1600 (vertical) pixels at 60 Hz, as used in Eqs. (4) and (5) above, then $T_h$=10.13 µs (according to DMT specs). Then the total number of read cycles possible from the buffer is given as $$C_r = \frac{T_h}{T_2} = \frac{10.13 \times 10^{-6} s}{3.724 \times 10^{-9} s} = 2720.19, \quad (6)$$

Thus, to avoid a buffer overflow at the sink buffer, the number of write cycles may be limited to $C_r$. This leads to an allowed blanking time on the input data $T_b$ which is $$T_b = T_h - C_r \cdot T_1 = (10130 - 2720.19 \times 3.702) \text{ ns} = 59.86 \text{ ns}, \quad (7)$$

In an overflow buffer situation, write pointer 230 will move ahead of read pointer 240 by a distance X given by:

$$X = \frac{T_b}{T_2} = \frac{59.86 \text{ ns}}{3.724 \text{ ns}} = 16.07 \approx 17, \quad (8)$$

Thus, a buffer depth 251 of at least 17 bits may be used in the above configuration for buffer 250. This allows pointer 230 to complete a horizontal line transmission in a single scan of buffer 250 while pointer 240 reads the data. In a buffer overflow scenario, $C_r$ may limit the number of blanking bits written by control 210 on buffer 250.

Other situations may be envisioned depending on the video display configuration. In some embodiments, a display resolution of 840 (vertical)×840 (horizontal) pixels may be used at a 60 Hz frame rate. Here, the DMT specs prescribe $T_h$=32.237 µs. Using Eqs. (4)-(8) results in a value of X for both underflow and overflow scenarios equal to 55 (rounded up). The value of $T_b$ in this case is given by Eq. (7) as $T_b$=191.55 ns.

In some embodiments of the present invention, a display resolution of 2560 (horizontal)×1600 (vertical) pixels may be used at a 120 Hz frame rate. Here, a value of $T_b$ may be used to prevent buffer overflow is 29 ns. And in this case the value of X that may be used is 9.

The depth 251 of FIFO buffer 250 can be 2·X or more, in order for rate matching device 150 to have memory to operate. By having a depth 251 of buffer 250 at least equal to 2·X, an underflow buffer scenario and an overflow buffer scenario may be avoided in sink display 120.

Figure 3:
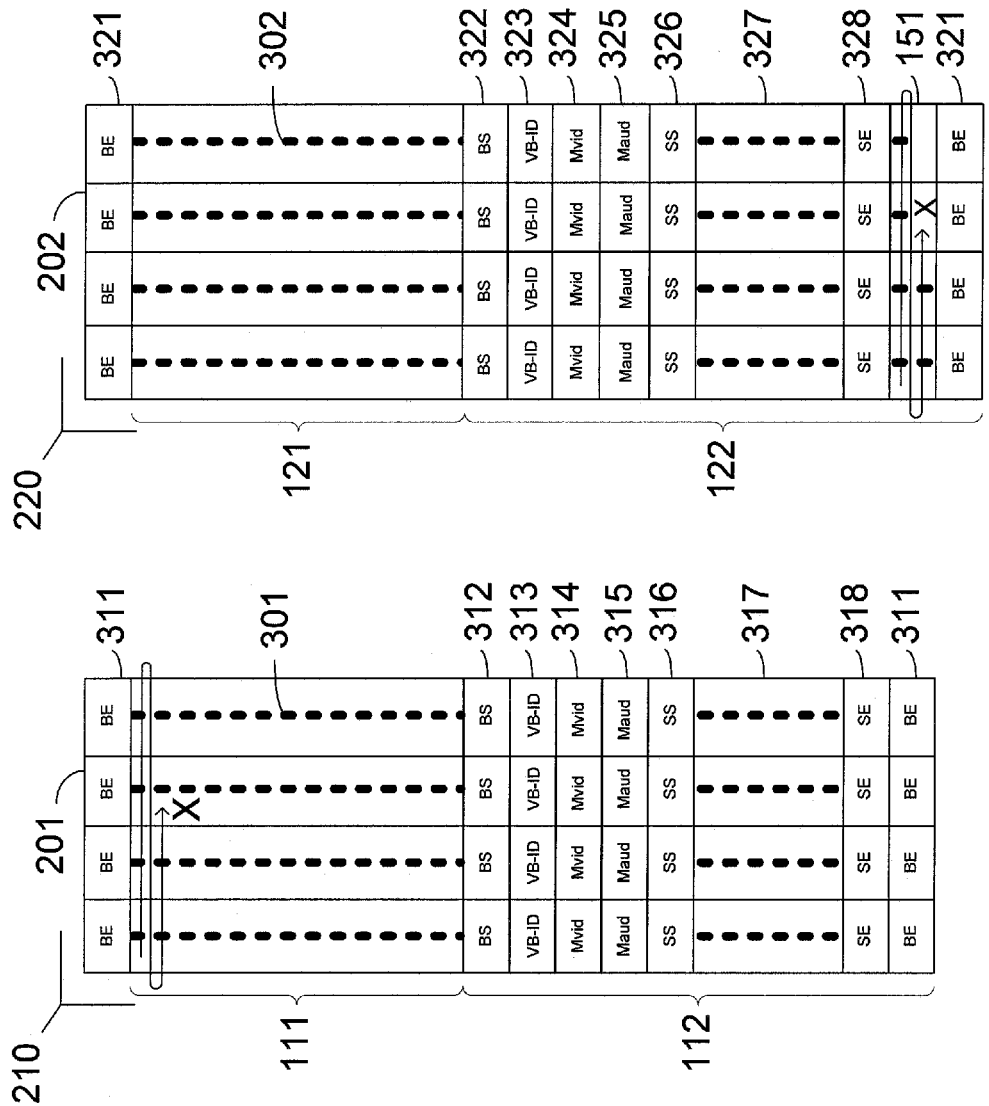
FIG. 3 shows the data structure of an input data stream for a write control and an output data stream for a read control according to some embodiments of the present invention.

FIG. 3 shows the data structure of an input data stream 201 for write control 210 and an output data stream 202 for read control 220, according to some embodiments of the present invention. The video data link in FIG. 3 includes four lanes. In some embodiments of the present invention, the video data link may include two lanes or only one lane. When the number of active lanes is reduced, the bandwidth scales down on both write control 210 and read control 220 of FIFO buffer 250, thus relaxing the need for an extended depth 251 of buffer 250. Therefore, the calculations for X above provide a minimum FIFO depth 251 even for a data link with fewer lanes.

Pixel line data 111 and 121 contain data 301 and 302 for individual pixels in a horizontal line of a video display. In some embodiments of the present invention, data 301 and 302 may be related to an intensity of a Red, Green, or Blue color for a given pixel. Following the line data 111 and 121 are the blanking periods 112 and 122 having blanking data. Blanking periods 112 and 122 start with 'blanking start' (BS) codes 312 and 322, respectively. In some embodiments, BS code 312 and 322 may be followed by VB-ID code 313 and 323, respectively. VB-ID codes 313 and 323 may include information regarding the type and configuration of the video signal being transmitted. For example, some embodiments of the present invention may include information as to whether or not the blanking period is a vertical blanking period. Codes 313 and 323 may further include a bit to indicate whether or not the main stream is configured as an interlaced video signal. Also, codes 313 and 323 may include a field ID flag, to indicate whether the pixel line is the last active line in the top field or a bottom field in an interlaced video configuration. Codes 313 and 323 may also include a no video stream flag, an audio mute flag, an HDCP sync detect code, and a reserved bit. Some embodiments may also include Mvid codes 314 and 324 after VB-ID code. Mvid codes 314 and 324 may include the least significant 8 bits of the time stamp value for the video stream. After Mvid codes 314 and 324, some embodiments may further include Maud codes 315 and 325. Maud codes 315 and 325 may include the least significant 8 bits of the time stamp value for the audio stream. Mvid and Maud 314, 315, 324, and 325 may be used for video clock recovery according to some embodiments of the present invention.

According to some embodiments of rate matching device 150, the link rate between source device 110 and sink device 120 is modified. Therefore, the values of Mvid code 314 and Maud code 315 need to be modified accordingly to provide Mvid code 324 and Maud code 325. This will ensure that the clock rate for sink device 120 may be recovered.

In some embodiments of the present invention, blanking periods 112 and 122 may include a section for the transfer of secondary data from the source device 110 to the sink device 120. This section starts with 'secondary start' SS code 316 and 326, and is followed by secondary data codes 317 and 327. The secondary data stream stops with a 'secondary end' SE code 318 and 328. Although secondary data codes 317 and 327 do not contain information to be displayed by the pixels, they carry information that may be utilized by sink device 120 to process pixel line data carried in sections 111 and 121 and to produce a video display.

In some embodiments of the present invention, the data from source device 110 may be descrambled by write control 210. Furthermore, the data may be HDCP-decoded before write control 210 writes the raw pixel data into FIFO buffer 250. Accordingly, in some embodiments of the present invention, read control 220 may re-scramble the data before transmitting data stream 202 to sink device 120. Read control 220 may further HDCP-encode the data before transmitting data stream 202 to sink device 120. The exact data manipulation performed by rate matching device 150 will depend on whether the content being sent is protected (e.g. HDCP-encoded) and the type of encoding used. Also, the presence of secondary data in the stream may indicate further manipulation by matching device 150.

In the case of a buffer underflow scenario, as mentioned above with relation to FIG. 2 and Eqs. (2-5), read control 220 may insert blanking data 151 into the transmission stream. Blanking data 151 is written by read control 240 while read pointer 240 waits for write pointer 230 to reach ahead of read pointer by a distance of X bits in FIFO buffer 250.

Figure 4:
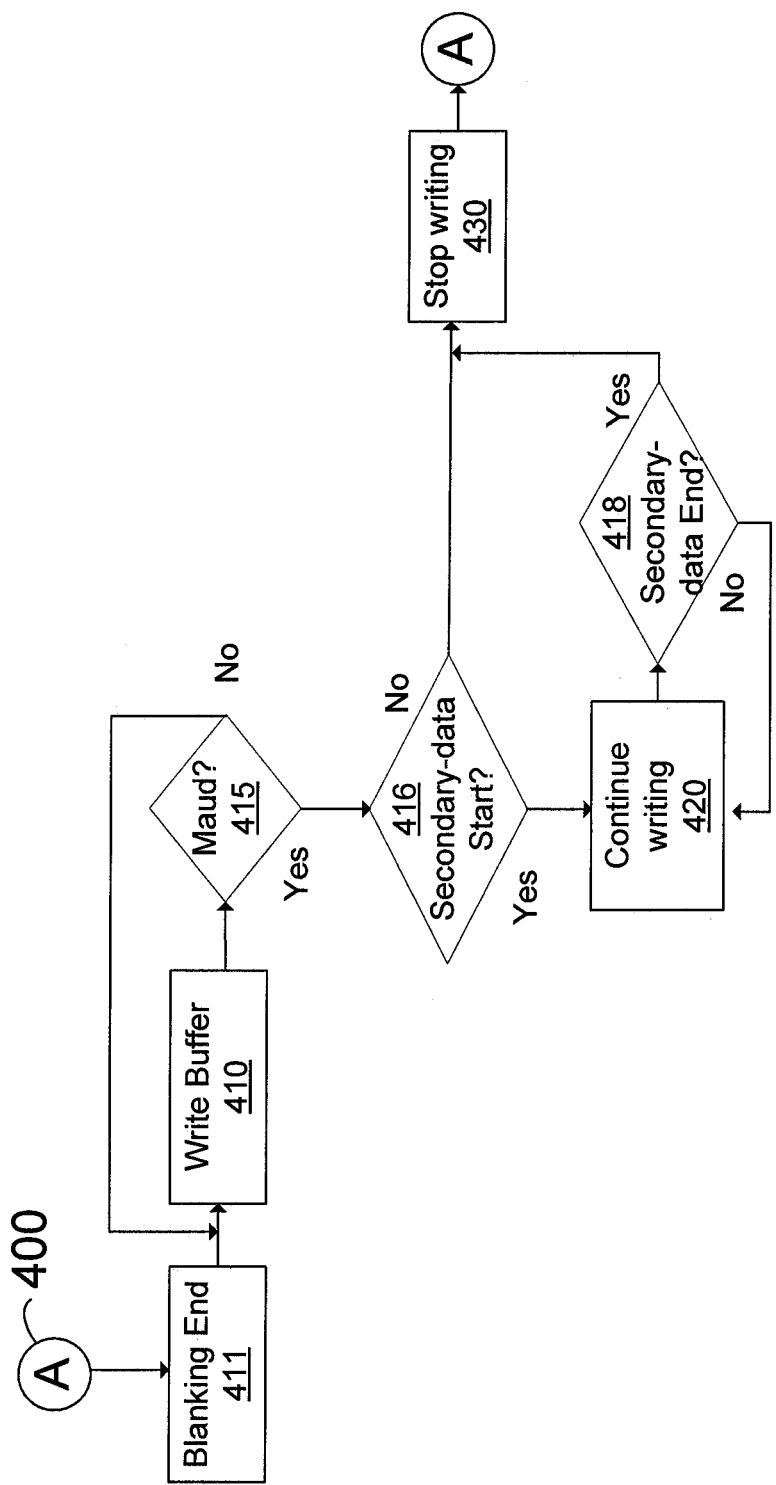
FIG. 4 shows a flow chart of the operation of a write control in a rate matching device according to some embodiments of the present invention.

FIG. 4 shows a flow chart for the operation of write control 210 in rate matching device 150 according to some embodiments of the present invention. At stage 400 (A), write control 210 waits for a blanking period to end. At step 411, a BE code 311 is encountered in input data stream 201, signaling write control 210 to proceed to stage 410. In stage 410, write control 210 writes the pixel line bits onto FIFO buffer 250. According to some embodiments of the present invention, write control 210 continues to write pixel line bits 301 onto buffer 250 until a Maud code 315 is encountered in stage 415. This is 3 cycles past the BS code 312, according to some embodiments depicted in FIG. 3. If an SS code 316 is encountered in stage 416, then write control 210 continues to write the secondary data into FIFO buffer 250 at stage 420 until an SE code 318 is encountered in data stream 201 at stage 418. Once an SE code 318 is encountered at stage 418, then write control 210 stops writing data in stage 430 and waits for a new BE code 311 to occur (A). If no SS code 316 is found in data stream 201 at stage 416, then write control 210 stops writing data into FIFO buffer 250 at stage 430, and waits for the next BE code 311 to occur (A).

Figure 5:
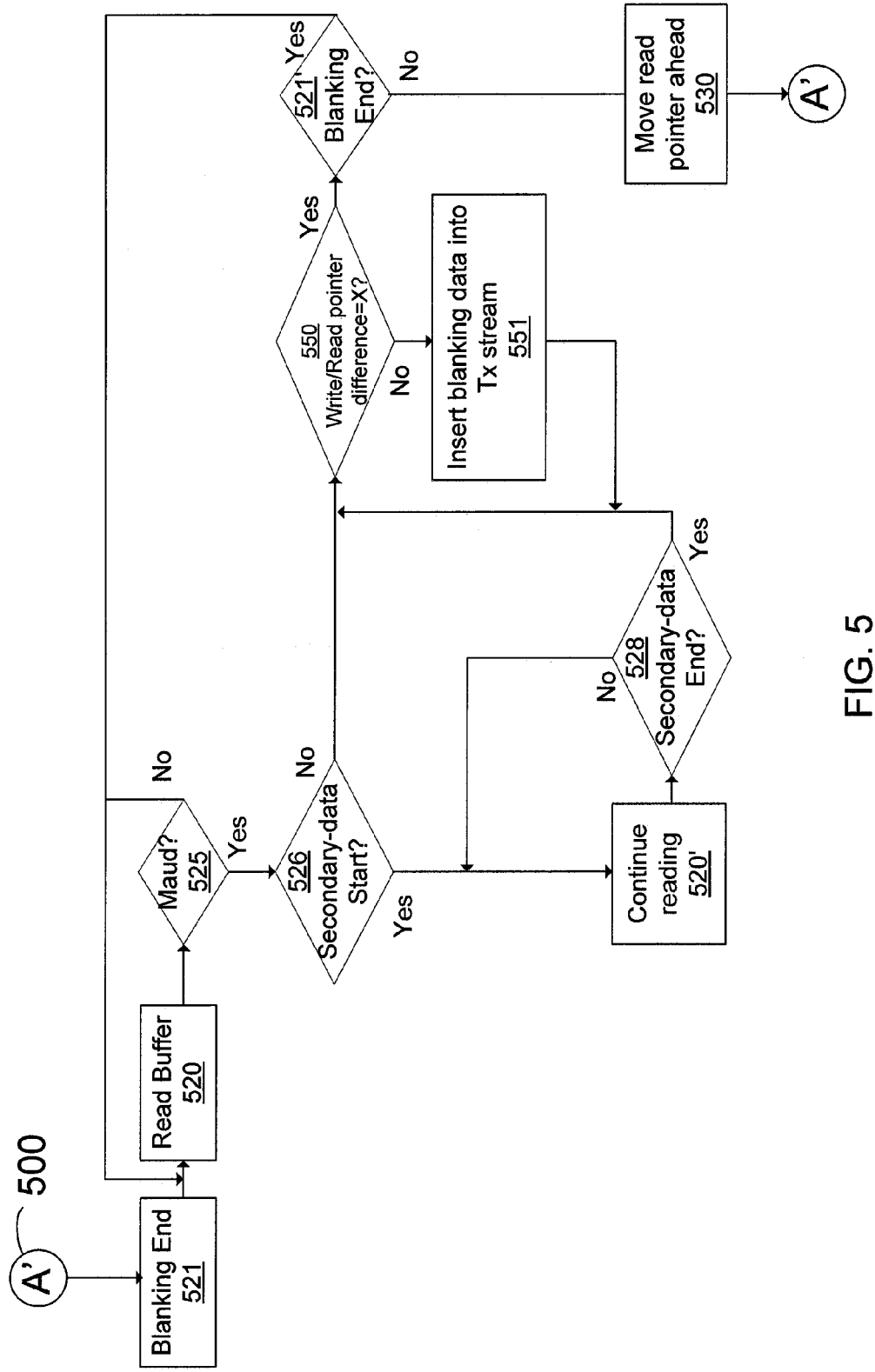
FIG. 5 shows a flow chart of the operation of a read control in a rate matching device according to some embodiments of the present invention.

FIG. 5 shows a flow chart for the operation of read control 220 in rate matching device 150 according to some embodiments of the present invention. At stage 500 (A'), read control 220 moves read pointer 240 up in FIFO buffer 250. If a BE code 321 is found at step 521, then buffer 250 is read and pixel data 302 is written to output data stream 202 in stage 520. Read control 220 continues to read pixel line data from buffer 250 and insert the data into stream 202 until a Maud code 325 is encountered in stage 525. This is 3 cycles past a BS code 322, according to some embodiments depicted in FIG. 3. If an SS code 326 is encountered in stage 526, then read control 220 continues to read the secondary data from FIFO buffer 250 at stage 520' until an SE code 328 is encountered at stage 528. Once an SE code 328 is encountered at stage 528, read control 220 moves on to stage 550, where a decision is made whether or not the distance between pointers 230 and 240 is equal to X bits.

If the distance between write pointer 230 and read pointer 240 in FIFO buffer 250 is less than X bits, then read control 220 inserts blanking data into output stream 202 at stage 551. The value X is calculated by processor 260 for underflow scenarios in Eqs. (2-5). While read control 220 is in stage 551, write control 210 keeps writing data onto FIFO buffer 250, until write pointer 230 moves ahead of read pointer 240 by X bits. When this distance is equal to X bits, then stage 521' follows, where a decision is made whether or not the next bit encountered in FIFO buffer 250 is a BE code 321. If the answer is Yes, then read control enters stage 520 and starts reading FIFO buffer 250 for new pixel line bits 302. If the answer to decision stage 521' is No, then read control moves read pointer ahead one bit in buffer 250 in stage 530 and looks for a new BE code 321 to occur in FIFO buffer 250 (A').

If no SS code 326 is found in FIFO buffer 250 at stage 526, then read control 220 transitions directly to stage 550.

Figure 6:
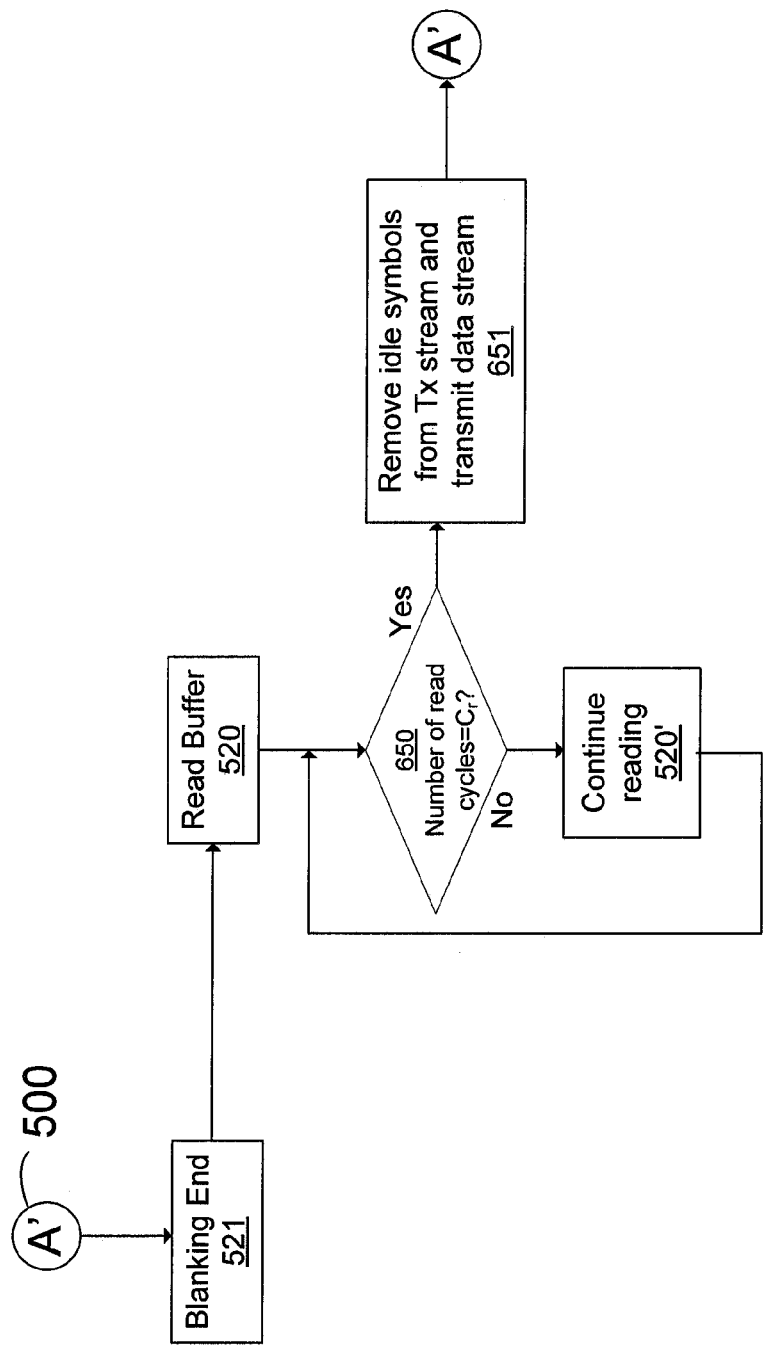
FIG. 6 shows a flow chart of the operation of a read control in a rate matching device for an overflow scenario, according to some embodiments of the present invention.

FIG. 6 shows a flow chart of the operation of a read control in a rate matching device for an overflow scenario, according to some embodiments of the present invention. An overflow scenario may occur when write control 210 operates at a clock rate that is higher than the clock rate of read control 220. For example, source device 110 may not support SSC and can only output data at a fixed rate e.g. 2.7 Gbps, (1 Gbps=$10^9$ bits per second). Furthermore, SSC may be used on the link to reduce EMI; thus, FIFO buffer 250 may introduce SSC. In some embodiments of the present invention, e.g. those implementing DP standards, SSC may be in the range of nominal data rate to nominal minus 5000 ppm. Thus, the average clock rate of read control 220 will be lower than the average clock rate of write control 210. As mentioned above, in an overflow scenario a limited number of read cycles may be used during a horizontal line data transfer, $C_r$. Therefore, FIFO buffer 250 may remove idle symbols when the read count equals $C_r$, during the blanking period. The value of $C_r$ may be calculated using Eq. (6).

At stage 500 (A'), read control 220 moves read pointer 240 up in FIFO buffer 250. If a BE code 321 is found at step 521, then buffer 250 is read and pixel data 302 is written to output data stream 202 in stage 520. Read control 220 continues to read pixel line data from buffer 250 and inserting the data into stream 202 until the number of read cycles becomes equal to $C_r$. A comparison between the number of read cycles and $C_r$ is performed in stage 650. If the number of read cycles is equal to $C_r$, then read control 220 removes the idle symbols and transmits data stream 202 to sink device 120 in stage 651. The idle symbols removed from the buffer are the idle symbols up to the next BE code 321 encountered in FIFO buffer 250. Finally, read control 220 returns to stage 500 (A').

Embodiments of the invention described above are exemplary only. One skilled in the art may recognize various alternative embodiments from those specifically disclosed. Those alternative embodiments are also intended to be within the scope of this disclosure. As such, the invention is limited only by the following claims.

The invention claimed is:

1. A rate matching device for use in data links between a source device and a sink device, comprising:
   a first-in-first-out (FIFO) buffer having a write pointer and a read pointer;
   a write control, having a write clock, to write an input data stream from the source device into the FIFO buffer using the write pointer;
   a read control, having a read clock, to read data from the FIFO buffer using the read pointer, insert data into an output data stream, and transmit the output data stream to the sink device;
   a processor to provide a bit number based on a write period of the write clock and a read period of the read clock, wherein the read control inserts blanking data into the output data stream while the read pointer is stopped to allow the write pointer to move ahead by the bit number provided by the processor.

2. The rate matching device of claim 1, wherein the write clock is a clock rate of the source device and the read clock is a clock rate of the sink device.

3. The rate matching device of claim 2, wherein at least one of the source device and the sink device is a video display port.

4. The rate matching device of claim 3, wherein the data links provide a video stream between the source device and the sink device.

5. The rate matching device of claim 4, wherein an Mvid code and an Maud code in the video stream from the at least one video display port in the source device are modified to ensure that the clock rate for the sink device may be recovered.

6. The rate matching device of claim 4, wherein the write control descrambles the data before writing the input data stream into the FIFO buffer and further wherein
the read control scrambles the data before transmitting the output data stream to the sink device.

7. The rate matching device of claim 4, wherein the data link and the video stream comply with the DisplayPort standard specifications.

8. The rate matching device of claim 4, wherein the video stream further comprises a series of horizontal pixel lines followed by blanking periods having blanking data.

9. The rate matching device of claim 8, wherein the data inserted into the output data stream by the read control is blanking data.

10. A method for matching a transfer data rate in data links between a source device and a sink device, the method comprising the steps of:
writing an input data stream into a first-in-first-out (FIFO) buffer using a write control having a write clock and a write pointer in the FIFO buffer;
reading data from the FIFO buffer using a read control having a read clock and a read pointer to insert data into an output data stream;
providing a bit number with a processor, the bit number based on a write period of the write clock and a read period of the read clock; and
inserting blanking data into the output data stream using the read control while stopping the read pointer in the FIFO buffer to allow the write pointer to move ahead by the bit number provided by the processor.

11. A method of matching a transfer data rate in data links between a source device and a sink device, the method comprising:
moving a read pointer in a first-in-first-out (FIFO) data buffer to encounter a first blanking end code in a data stream;
reading data from the FIFO data buffer and transmitting the data stream to a sink device after the first blanking end code is encountered, until a Maud code is encountered;
continue reading if a secondary data code is detected until a secondary data end code is detected;
insert blanking data in a transmitted data stream until a write pointer is ahead of the read pointer by a selected number of bits;
continue moving the read pointer in the FIFO data buffer to encounter a second blanking end code in the data stream.

12. A method for using a read control to match a transfer data rate in data links between a source video display device and a sink video display device, the method comprising the steps of:
providing a read cycle limit number with a processor based on a horizontal pixel line period and a read clock period;
moving a read pointer in a first-in-first-out (FIFO) data buffer to encounter a first blanking end (BE) code in the data;
reading data from the FIFO data buffer after the first BE code is encountered;
continuing to read data from the FIFO data buffer until a number of read cycles is equal to the read cycle limit number;
removing idle symbols from the FIFO buffer up to a second BE code and transmitting the resulting data stream to a sink device when the number of read cycles becomes equal to the read cycle limit number.

* * * * *